US011915642B2

(12) United States Patent
Li

(10) Patent No.: US 11,915,642 B2
(45) Date of Patent: Feb. 27, 2024

(54) DISPLAY DEVICE AND EQUIPMENT

(71) Applicant: Yungu (Gu'an) Technology Co., Ltd., Hebei (CN)

(72) Inventor: Zheng Li, Kunshan (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 20 days.

(21) Appl. No.: 17/514,597

(22) Filed: Oct. 29, 2021

(65) Prior Publication Data

US 2022/0051616 A1 Feb. 17, 2022

Related U.S. Application Data

(63) Continuation of application No. PCT/CN2020/101037, filed on Jul. 9, 2020.

(30) Foreign Application Priority Data

Oct. 31, 2019 (CN) ......................... 201911054682.3

(51) Int. Cl.
*G09G 3/3208* (2016.01)
*G09G 3/20* (2006.01)
*G09G 3/30* (2006.01)

(52) U.S. Cl.
CPC ......... *G09G 3/3208* (2013.01); *G09G 3/2003* (2013.01); *G09G 2300/0413* (2013.01);
(Continued)

(58) Field of Classification Search
CPC ......... G09G 3/2003; G09G 2300/0452; G09G 3/3233; G09G 3/3648; G09G 3/2074;
(Continued)

(56) References Cited

U.S. PATENT DOCUMENTS 9,123,181 B2 * 9/2015 Lee ........................ G11B 27/34
11,048,905 B2 * 6/2021 Zhang .................. G06F 1/1684
(Continued)

FOREIGN PATENT DOCUMENTS

CN 101106639 A 1/2008
CN 101650912 A 2/2010
(Continued)

OTHER PUBLICATIONS

Office Action dated Sep. 1, 2020 in corresponding Chinese Application No. 201911054682.3; 15 pgs.
(Continued)

*Primary Examiner* — Dismery Mercedes
(74) *Attorney, Agent, or Firm* — Maier & Maier, PLLC

(57) ABSTRACT

A display device includes: a display unit, a first logic control unit and a light emitting driving unit. The first logic control unit is configured to receive image display data for instructing the display unit to display a static image in a local area, if it is determined that the local area maintains displaying the static image beyond a first threshold duration, then preset replacement display data and the image display data are alternately transmitted to the light-emitting driving unit, where a transmission frequency of the replacement display data is a preset maintenance frequency, and the replacement display data is used to enable the display unit to display a replacement color image in the local area; and the light-emitting driving unit is configured to respond to the data received from the first logic control unit and control the display unit to display the static image or the replacement color image.

16 Claims, 6 Drawing Sheets

(52) U.S. Cl.
CPC . *G09G 2300/0443* (2013.01); *G09G 2310/08* (2013.01); *G09G 2320/0242* (2013.01); *G09G 2320/0257* (2013.01); *G09G 2330/10* (2013.01)

(58) Field of Classification Search
CPC ............. G09G 3/20; G09G 2320/0626; G09G 3/3208; G09G 2320/0233; G09G 2320/0257; G09G 2320/0242; G09G 2300/0443; G09G 3/3225; G09G 2320/02; G09G 2330/10; G09G 3/30; G09G 2300/0413
See application file for complete search history.

(56) References Cited

U.S. PATENT DOCUMENTS

| | | | | |
|---|---|---|---|---|
| 11,222,928 | B2 * | 1/2022 | Hack | H10K 59/131 |
| 2006/0007080 | A1 | 1/2006 | Yeh | |
| 2011/0242149 | A1 * | 10/2011 | Yoshida | G09G 3/3648 345/88 |
| 2012/0188262 | A1 * | 7/2012 | Rabii | G09G 5/393 345/534 |
| 2012/0229443 | A1 * | 9/2012 | Liu | G09G 5/18 345/212 |
| 2013/0155090 | A1 * | 6/2013 | Pourbigharaz | G06F 1/3265 345/589 |
| 2014/0217426 | A1 * | 8/2014 | Inokuchi | H01L 23/12 257/737 |
| 2016/0343301 | A1 * | 11/2016 | Choi | G09G 3/3208 |
| 2018/0122332 | A1 * | 5/2018 | Ikeda | G02F 1/134336 |
| 2019/0080970 | A1 * | 3/2019 | Chaji | H01L 22/24 |
| 2019/0333472 | A1 * | 10/2019 | Kim | G09G 5/02 |
| 2020/0211454 | A1 * | 7/2020 | Ohnishi | G09G 3/30 |
| 2020/0312922 | A1 * | 10/2020 | Hack | H10K 59/351 |
| 2020/0380938 | A1 * | 12/2020 | Greenebaum | G09G 5/06 |

FOREIGN PATENT DOCUMENTS

| | | | |
|---|---|---|---|
| CN | 102723062 | A | 10/2012 |
| CN | 103730090 | A | 4/2014 |
| CN | 104821160 | A | 8/2015 |
| CN | 106023887 | A | 1/2016 |
| CN | 105741813 | A | 7/2016 |
| CN | 105788528 | A | 7/2016 |
| CN | 106097961 | A | 11/2016 |
| CN | 106601189 | A | 4/2017 |
| CN | 108614654 | A | 10/2018 |
| CN | 109147658 | A | 1/2019 |
| CN | 110299104 | A | 10/2019 |
| CN | 110738969 | A | 1/2020 |
| JP | 2011017746 | A | 1/2011 |

OTHER PUBLICATIONS

Office Action dated Feb. 24, 2021 in corresponding Chinese Application No. 201911054682.3; 24 pgs.
Junsheng Yu, Chaoyong Tian, "Fundamentals and Industrialization of OLED Display", University of Electronic Science and Technology of China Press, Feb. 28, 2015, Relevant pages of the publication: p. 84, Place of publication: Chengdu, Sichuan Province, China, 10 pgs.
International Search Report dated Sep. 28, 2020 in corresponding Application No. PCT/CN2020/101037; 8 pgs.

* cited by examiner

DISPLAY DEVICE AND EQUIPMENT

CROSS-REFERENCE TO RELATED APPLICATIONS

This application is a continuation of International Application No. PCT/CN2020/101037, filed on Jul. 9, 2020, which claims priority to Chinese Patent Application No. 2019110546823, filed on Oct. 31, 2019, both of the applications are hereby incorporated by reference in their entireties.

TECHNICAL FIELD

The present application relates to the field of display technology, in particular to a display device and equipment.

BACKGROUND

OLED (Organic Light-Emitting Diode), that is an organic light-emitting diode, is a self-luminescence display device using an organic thin film as a luminescence body. Its working principle is: driven by an external voltage, electrons and holes injected by an electrode recombine and release energy in an organic material, and the energy is transferred to a molecule of an organic luminescence substance, which is excited and performs transition from a ground state to an excited state. When the excited molecule returns from the excited state to the ground state, a radiation transition thereof produces a luminescence phenomenon.

In current display devices, it is usually necessary to display specific static images, such as virtual button icons, virtual frame images, and the like, in fixed local areas. However, as a use time of OLED increases and the OLED heats up, a blue sub-pixel material ages faster, therefore, the luminescence efficiency of blue sub-pixels rapidly decreases in these local areas where the static images are displayed, thereby resulting in the OLED display devices leaving permanent local afterimages in these local areas, and it is difficult to avoid a problem of “screen burn”.

SUMMARY

Embodiments of the present application provide a display device and equipment, which reduces the possibility of appearing local afterimages, solves the problem of “screen burn”, and extends the service life of the display device.

In a first aspect of the present application, a display device is provided, including: a first logic control unit, a display unit, and a light-emitting driving unit connected respectively to the first logic control unit and the display unit, where the first logic control unit is configured to receive image display data for instructing the display unit to display a static image in a local area, if it is determined that the local area maintains displaying the static image beyond a first threshold duration, then preset replacement display data and the image display data are alternately transmitted to the light-emitting driving unit, where a transmission frequency of the replacement display data is a preset maintenance frequency, and the replacement display data is used to enable the display unit to display a replacement color image in the local area; and the light-emitting driving unit is configured to respond to the data received from the first logic control unit, and control the display unit to display the static image or the replacement color image.

The embodiments of the present application refresh the local area displaying the same static image for a long time to the replacement color image at the maintenance frequency, change the display content, avoid sub-pixels in the local area from working for a long time, reduce the possibility of local screen burn caused by the local area displaying the same static image for a long time, and extend the service life and display performance of the display unit.

The embodiments of the application consider that as an accumulative luminescence duration of a luminescence unit increases, a luminescence material with blue sub-pixels is gradually aging, the brightness of the blue sub-pixels after the material is aging can be improved by gradually strengthening the driving current of the blue sub-pixels, thereby a brightness range of blue light in the luminescence unit is maintained, the reliability of blue light in the luminescence unit is improved, the possibility that a display color becomes yellow due to the aging of the blue sub-pixels is reduced, and the user experience is improved.

The present application discloses a display device and equipment, in the display device, the first logic control unit receives the image display data for instructing the display unit to display the static image in the local area, if it is determined that the local area maintains displaying the static image beyond the first threshold duration, then the preset replacement display data and the image display data are alternately transmitted to the light-emitting driving unit, where the transmission frequency of the replacement display data is the preset maintenance frequency, and the replacement display data is used to enable the display unit to display the replacement color image in the local area; and the light-emitting driving unit responds to the data received from the first logic control unit, and controls the display unit to display the static image or the replacement color image. Thus, the local area displaying the same static image for a long time is refreshed to the replacement color image at the maintenance frequency, the display content is changed, the sub-pixels in the local area are avoided from working for a long time, the possibility of local screen burn caused by the local area displaying the same static image for a long time is reduced, and the service life and display performance of the display unit are extended.

DETAILED DESCRIPTION OF THE EMBODIMENTS

In order to make the objects, technical solutions and advantages of the embodiments of the present application more clear, the technical solutions in the embodiments of the present application will be clearly and completely described in combination with the accompanying drawings in the embodiments of the present application, obviously, the described embodiments are part of the embodiments of the present application, but not all of the embodiments. Based on the embodiments of the present application, all other embodiments obtained by those of ordinary skill in the art without creative efforts are within the protection scope of this application.

The technical solution of the present application will be described in detail below with specific embodiments.

Figure 1:
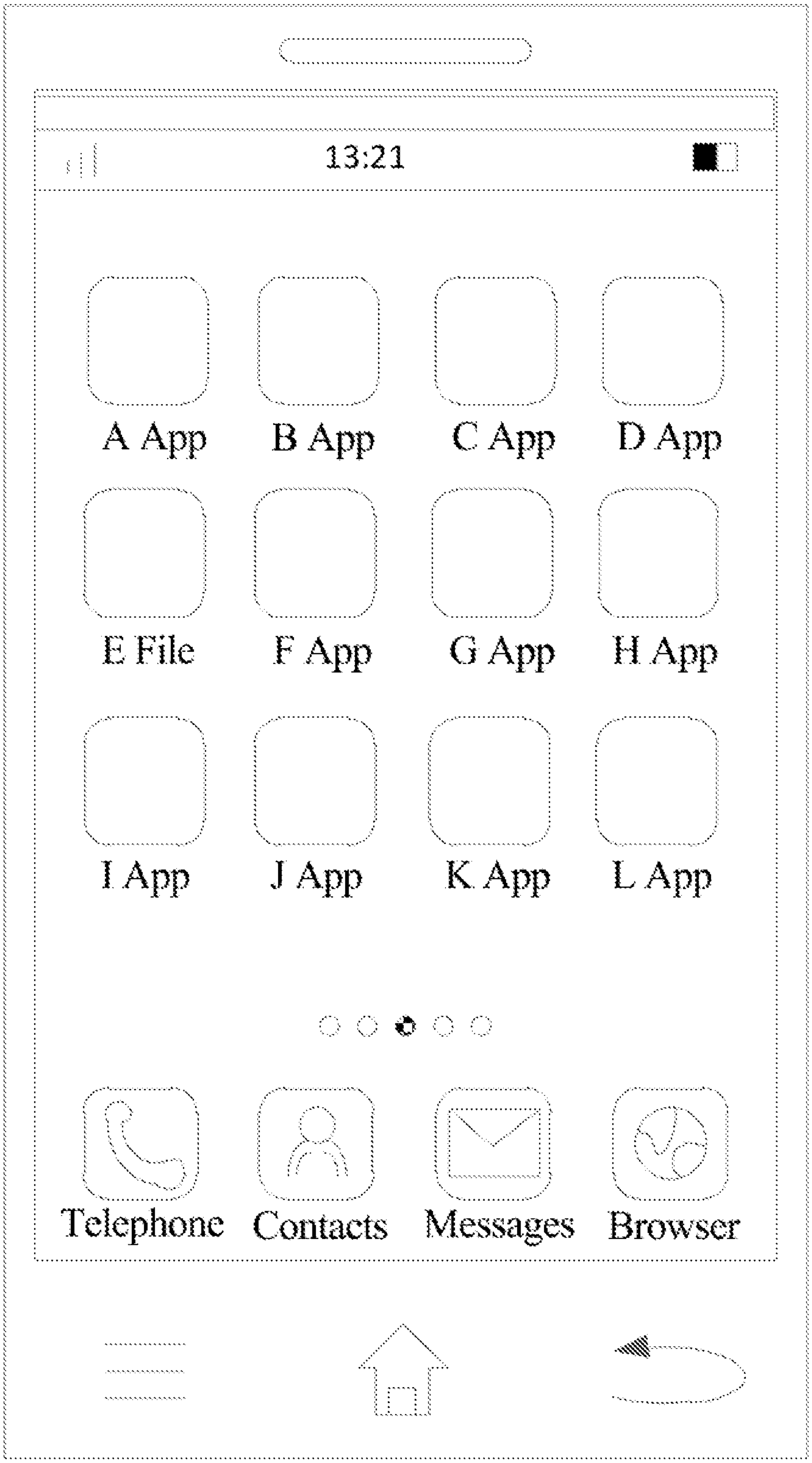
FIG. 1 is an example of a static image display.
Figure 2:
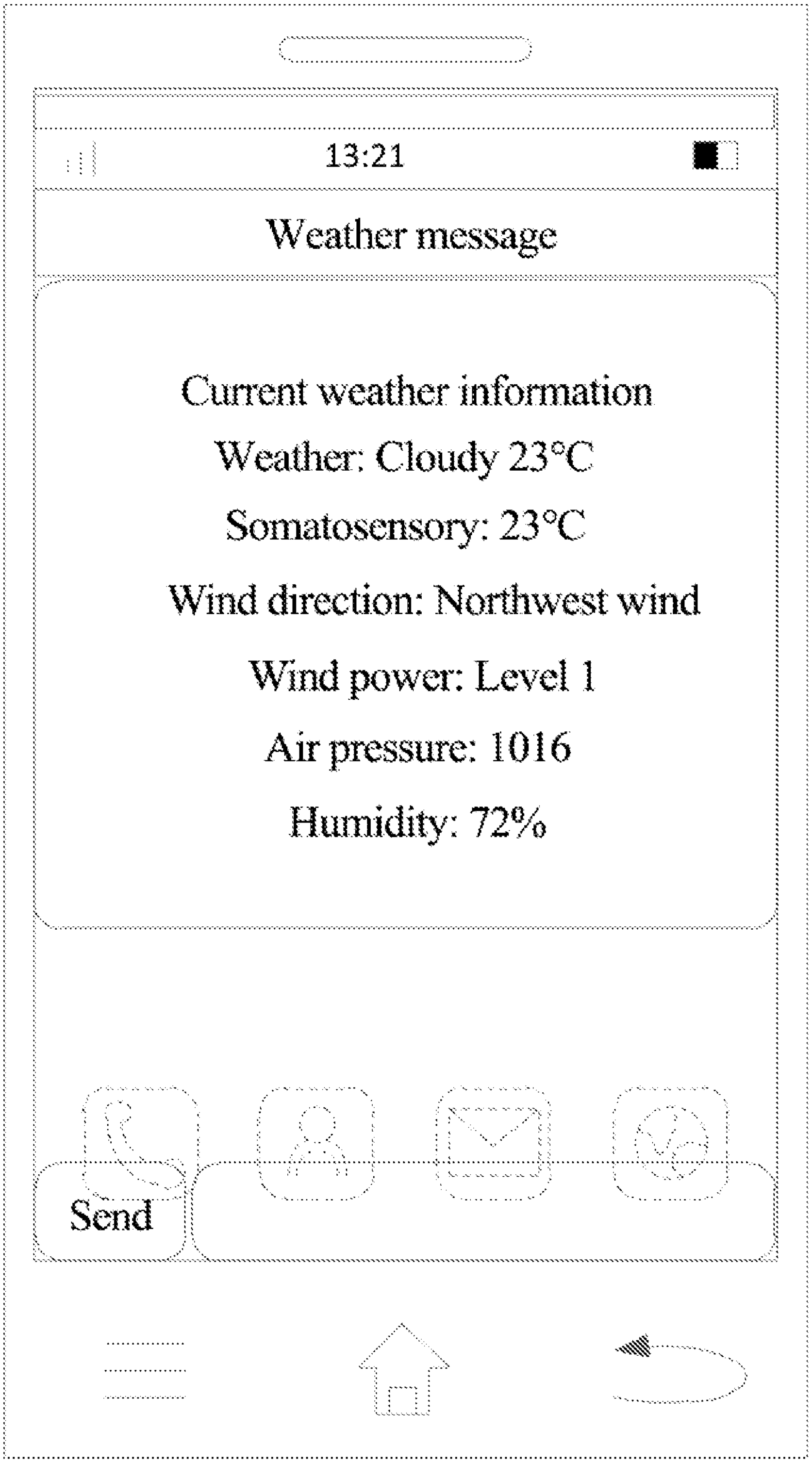
FIG. 2 is an example of an afterimage display.

In some display devices, such as mobile phone display screens, there is a need to display some virtual buttons, frame images, or icons of resident applications in a fixed screen area. Refer to an example of a static image display of FIG. 1, as shown in FIG. 1, a mobile phone display screen displays a column of resident application icons (phone, contacts, message, browser) in a main interface at the bottom of the screen, when a user selects an application by turning pages on the main interface, the icons of the resident applications at the bottom remain unchanged. After a long period of use, the mobile phone display screen may produce afterimages at positions of the icons of these resident applications. FIG. 2 is an example of an afterimage display. Afterimages of resident applications shown in FIG. 2 have the same graphic characteristics as the icons of the resident applications shown in FIG. 1. After entering an application interface, all the application icons on the main interface will not be displayed, and the application interface should be displayed in full screen. However, dashed icons as shown in FIG. 2 indicate that the afterimages of the icons of the resident applications are displayed in an area that should have been blank, which results in a poor user experience.

The occurrence of an afterimage phenomenon shown in FIG. 2 is usually due to a difference of the luminescence efficiency among pixel units related to these local areas where the afterimage occurs and other surrounding pixel units. Specifically, it is usually caused by a faster decay of the luminescence efficiency of the pixel units in these local areas. A certain fixed position on the display device displays the same static image for a long time, which causes an organic luminescence material corresponding to this part of the pixel units to be more severely worn than the pixel units in other positions, and finally causes the luminescence efficiency of the pixel units to decay rapidly, and then an afterimage is left on the screen of the display device, that is, the problem of “screen burn”.

Figure 3:
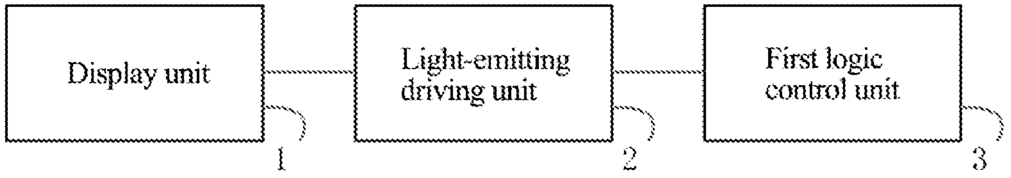
FIG. 3 is a schematic structural diagram of a display device according to an embodiment of the present application.

Refer to FIG. 3, which is a schematic structural diagram of a display device according to an embodiment of the present application. The display device shown in FIG. 3 includes: a first logic control unit 3, a light-emitting driving unit 2 and a display unit 1. The display unit 1 may be a display panel, a display module, a display screen, and the like, which is not limited here. As shown in FIG. 3, the light-emitting driving unit 2 is connected to the first logic control unit 3 and the display unit 1 respectively. The display unit 1 shown in FIG. 3 may be a screen body containing a plurality of pixel units, where the pixel units are, for example, OLED pixel units. The first logic control unit 3 and the light-emitting driving unit 2 shown in FIG. 3 may be arranged in an integrated circuit (IC) in a chip on film (COF) substrate. For example, a soft additional circuit board is pre-used as a package chip carrier, and a first logic control IC and a light-emitting driving IC are combined with a soft substrate circuit.

The first logic control unit 3 is configured to receive image display data for instructing the display unit 1 to display a static image in a local area, if it is determined that the local area maintains displaying the static image beyond a first threshold duration, then preset replacement display data and the image display data are alternately transmitted to the light-emitting driving unit 2. Where, a transmission frequency of the replacement display data is a preset maintenance frequency, and the replacement display data is used to enable the display unit 1 to display a replacement color image in the local area.

Usually, image display data to be displayed is received by the light-emitting driving unit 2, then parsed into drive information, and transmitted to the display unit 1 to drive the display unit 1 to perform corresponding luminescence display.

In this embodiment, the first logic control unit 3 is added. The first logic control unit 3 is arranged between an input terminal of the light-emitting driving unit 2 and an external input line, and intercepts, for example, image display data that a central processing unit (CPU) originally intends to directly transmit to the light-emitting driving unit 2. The first logic control unit 3 monitors the image display data. The image display data here is, for example, display data used to display the icons of the resident applications, in addition, may also include other display data, and the present embodiment may not be limited to this. The image display data indicates luminescence conditions of each pixel unit of the display unit 1, such as color characteristics and brightness characteristics of the pixel unit, thereby realizing an overall image display of the display unit 1. The first logic control unit 3 may identify the luminescence conditions of each pixel unit by monitoring the image display data, and then may determine a local area displaying the same static image for a long time. Where displaying for a long time may be a display that a display time thereof exceeds the first threshold duration, and the local area includes at least one pixel unit. The local area here may be a part of all display areas of the display unit 1 or a part of a preset monitoring area of the display unit 1.

The alternately transmitting the replacement display data and the image display data to the light-emitting driving unit 2, may be that, after the image display data is transmitted to the light-emitting driving unit 2 one or more times, the replacement display data is transmitted to the light-emitting driving unit 2 once, to enable the light-emitting driving unit 2 to shortly display the replacement color image corresponding to the replacement display data, and then the image display data is transmitted to the light-emitting driving unit 2 one or more times, through this cycle, until that the first logic control unit 3 does not receive the same above-mentioned image display data (for example, when the resident application icon is no longer displayed when the application interface is displayed).

Before alternately transmitting the preset replacement display data and the image display data to the light-emitting driving unit 2, the first logic control unit 3 may also be configured to acquire a preset replacement color image, or acquire the replacement color image according to graphic characteristics and color characteristics of the static image. The graphic characteristics in this embodiment, for example, may be a sum of characteristics of pattern and shape of the image, including an outer contour of the image and a shape of inner filling content. For example, the replacement color image and the static image have the same graphic characteristics, but have different color characteristics. Taking a short message icon shown in FIG. 1 as an example, graphic characteristics of the replacement color image and the static image both include a rounded square characteristic of an outer frame image and an envelope shape characteristic of an envelope image in the outer frame image. For example, color characteristics of the replacement color image may be similar with color characteristics of the static image, thereby reducing a possibility that an alternate display is perceived by human eyes of the user. Alternatively, the color characteristics of the replacement color image may be completely opposite to the color characteristics of the static image, that is, the replacement color image is obtained by inverting color of the static image, thereby reducing the brightness of originally highlighted sub-pixels or turning off the originally highlighted sub-pixels to improve an anti-screen burn effect. Alternatively, pure color image with preset color may be used as the replacement color image to reduce the amount of calculation. There are many ways to determine the replacement image, and there is no limitation here. In this embodiment, the replacement color image may be preset, and may also be dynamically determined in real time; the service life of the display unit 1 is extended through a replacement display having different color characteristics with the static image.

Figure 4:
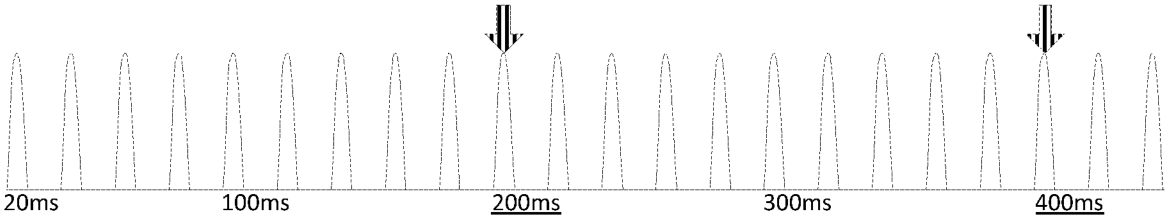
FIG. 4 is an example of displaying a replacement color image at a maintenance frequency according to an embodiment of the present application.

The first logic control unit 3 is further configured to acquire a maintenance frequency according to a refresh frequency of the display unit 1 before alternately transmitting the preset replacement display data and the image display data to the light-emitting driving unit 2, where the maintenance frequency is 5%-30% of the refresh frequency. Refer to FIG. 4, which is an example of displaying a replacement color image at a maintenance frequency according to an embodiment of the present application. As shown in FIG. 4, a refresh frequency of the display unit 1 is, for example, 50 Hz, that is, a refresh pulse is sent out every 20 ms to refresh a displayed static image once. In order to protect the display unit 1 and prevent occurring "screen burn" in the local area, display content of the local area may be changed during refreshing the display unit 1 one or more times, for example, switching to display a replacement color image with a different color from the static image. As shown in FIG. 4, taking that the maintenance frequency is 10% of the refresh frequency as an example, the maintenance frequency is 5 Hz, that is, during refreshing the display unit 1 for 10 times, the static image is displayed for 9 times and the replacement color image is displayed for one time. As shown in FIG. 4, in $200^{th}$ ms and $400^{th}$ ms refresh cycles, the display unit 1 is refreshed to the replacement color image. Then, since a color display time of the replacement color image is only 20 ms in every 200 ms, and the color of the static image is refreshed back in subsequently multiple refresh cycles, the human eyes of the user usually will not perceive it, and it will not affect the user experience. This embodiment reduces a possibility that the human eyes perceive image changes in the local area, and improves the user experience.

The light-emitting driving unit 2 is configured to respond to the data received from the first logic control unit 3, and control the display unit 1 to display the static image or the replacement color image.

Specifically, the light-emitting driving unit 2 may be specifically configured to: transmit drive information for displaying the static image in the local area to the display unit 1 when receiving the image display data; transmit drive information for displaying the replacement color image in the local area to the display unit 1 when receiving the replacement display data.

This embodiment discloses a display device, through that the first logic control unit 3 receives the image display data for instructing the display unit 1 to display the static image in the local area, if it is determined that the local area maintains displaying the static image beyond the first threshold duration, then the preset replacement display data and the image display data are alternately transmitted to the light-emitting driving unit 2, where the transmission frequency of the replacement display data is the preset maintenance frequency, and the replacement display data is used to enable the display unit 1 to display the replacement color image in the local area; and the light-emitting driving unit 2 responds to the data received from the first logic control unit 3, and controls the display unit 1 to display the static image or the replacement color image. Thus, the local area displaying the same static image for a long time is refreshed to the replacement color image at the maintenance frequency, the display content is changed, the sub-pixels in the local area are avoided from working for a long time, the possibility of local screen burn caused by the local area displaying the same static image for a long time is reduced, and the service life and display performance of the display unit 1 are extended.

Figure 5:
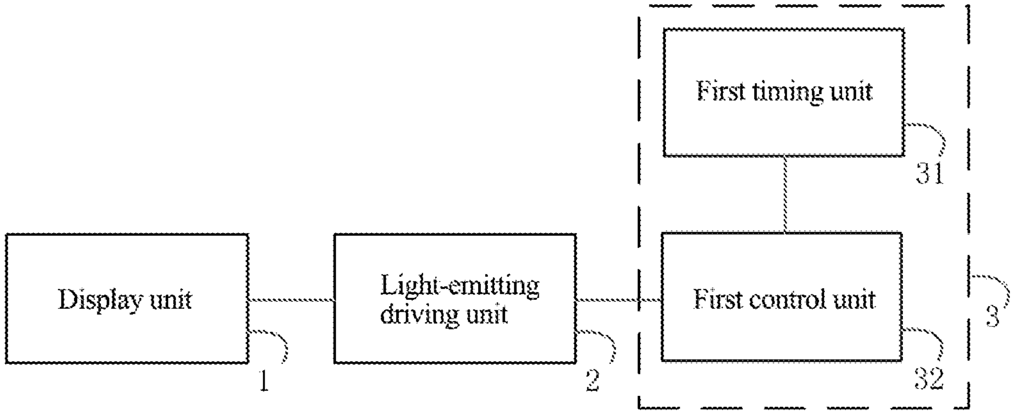
FIG. 5 is a schematic structural diagram of another display device according to an embodiment of the present application, where a first logic control unit may include: a first timing unit and a first control unit.

On the basis of the foregoing embodiments, refer to FIG. 5, which is a schematic structural diagram of another display device according to an embodiment of the present application. In the display device shown in FIG. 5, the first logic control unit 3 may include: a first timing unit and a first control unit. Both the first timing unit and the first control unit in this embodiment may have a hardware structure, a timing IC and a control IC. And the timing IC and the control IC may be arranged in the COF, for example. An anti-screen burn function can be realized by adding two chips to the existing display device, which reduces a pressure of software calculation processing.

The first control unit is configured to receive the image display data for instructing the display unit 1 to display the static image in the local area, and acquire a first display duration that the local area maintains displaying the static image from the first timing unit, and judging whether the first display duration exceeds the first threshold duration. If yes, the preset replacement display data and the image display data are alternately transmitted to the light-emitting driving unit 2, if not, the image display data is transmitted to the light-emitting driving unit 2, where the transmission frequency of the replacement display data is the preset maintenance frequency, and the replacement display data is used to enable the display unit 1 to display the replacement color image in the local area.

The first timing unit is configured to respond to the image display data received by the first control unit and time a duration that the local area maintains displaying the static image to obtain the first display duration.

The first control unit is configured to intercept data to be directly transmitted to the light-emitting driving unit 2 in the prior art, and provide it to the first timing unit at the same time, so as to use the first timing unit to time a display duration of the same static image of each pixel unit in the display unit 1. Once the displayed image is changed, the first timing unit re-times, so that the first timing unit obtains the first display duration that a certain local area maintains displaying the same static image. The first control unit determines whether there is a risk of screen burn of the local area according to the first display duration and the first threshold duration. If the first display duration exceeds the first threshold duration, and due to the risk of screen burn, it is necessary to switch to display the replacement color image. In this embodiment, a logical control of the replacement color image is implemented through the first timing unit and the first control unit, which improves the control reliability.

On the basis of the above-mentioned embodiments, a long time operation of a luminescence unit may not only have the risk of screen burn, but also have a risk of yellowish color development. In the display unit 1, the pixel units usually include red sub-pixels, green sub-pixels, and blue sub-pixels, so as to realize color display with three primary colors. However, a blue luminescence material with the blue sub-pixels is more susceptible to age and wear than luminescence materials with the other two sub-pixels, therefore, the luminescence efficiency of blue light decreases faster after a long time operation, resulting in the overall display color of the display device being yellowish.

In order to reduce the possibility of yellowish color development of the display device, the embodiment of the present application may also control the light-emitting driving unit 2 in a manner of using spare blue sub-pixels and/or compensating brightness with a driving current. In the following, other structures of the display device will be illustrated in combination with the attached drawings.

Figure 6:
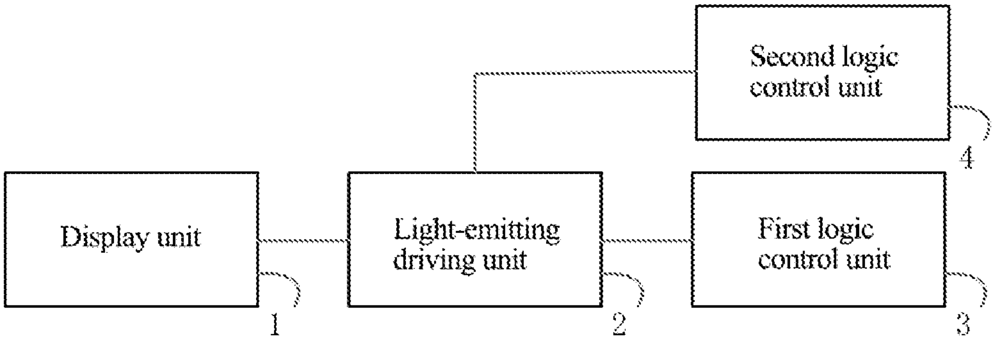
FIG. 6 is a schematic structural diagram of still another display device according to an embodiment of the present application, where the display device further includes a second logic control unit.

On the basis of the foregoing embodiment, refer to FIG. 6, which is a schematic structural diagram of still another display device according to an embodiment of the present application. In the embodiment shown in FIG. 6, the display unit 1 includes blue sub-pixels. For example, the display unit 1 includes a plurality of pixel units, and each pixel unit includes blue sub-pixels, red sub-pixels, and green sub-pixels. In this embodiment, the blue sub-pixels specifically include: original blue sub-pixels and spare blue sub-pixels. Structures of the original blue sub-pixels and the spare blue sub-pixels may be the same, for example, both are OLED blue luminescence sub-pixels.

On the basis of the foregoing embodiment, the display device in the embodiment shown in FIG. 6 may further include: a second logic control unit 4. The second logic control unit 4 is configured to transmit a spare switching instruction to the light-emitting driving unit 2 if it is determined that an accumulative luminescence duration of the display unit 1 exceeds a second threshold duration. It can be understood that the second logic control unit 4 accumulates a luminescence duration of the display unit 1, when it is detected that the accumulative luminescence duration exceeds the second threshold duration, it can be considered that the display unit 1 has been used for a relatively long time, a luminescence material with the blue sub-pixels thereof is worn out, the spare switching instruction is then transmitted to switch to start using the spare blue sub-pixels, thereby avoiding the overall screen display being yellowish.

The light-emitting driving unit 2 is further configured to transmit drive information to the original blue sub-pixels before receiving the spare switching instruction, respond to the spare switching instruction after receiving the spare switching instruction, transmit the drive information to the spare blue sub-pixels, and perform luminescence by replacing the original blue sub-pixels with the spare blue sub-pixels.

In this embodiment, the spare blue sub-pixels are used to replace aged original blue sub-pixels to emit blue light, which improves the reliability of blue light in the display unit 1, reduces a possibility that a display color becomes yellow due to the aging of the original blue sub-pixels, and improves the user experience.

Figure 7:
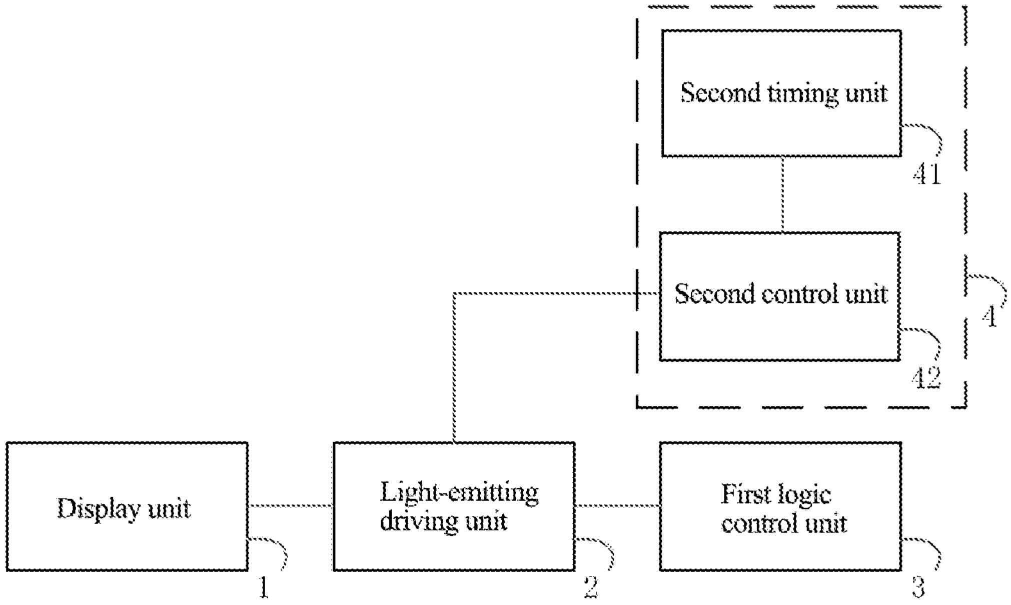
FIG. 7 is a schematic structural diagram of yet another display device according to an embodiment of the present application, where a second logic control unit may include a second timing unit and a second control unit.

Based on the embodiment shown in FIG. 6, refer to FIG. 7, which is a schematic structural diagram of yet another display device according to an embodiment of the present application. In the embodiment shown in FIG. 7, the second logic control unit 4 may include a second timing unit 41 and a second control unit 42. The second timing unit 41 and the second control unit 42 may be two ICs added to the COF, and may also be integrated in the timing IC and the control IC shown in FIG. 5, which are not limited here.

Continuing to refer to FIG. 6, the second control unit 42 is configured to acquire the accumulative luminescence duration of the display unit 1 from the second timing unit 41, and judge whether the accumulative luminescence duration is greater than or equal to the second threshold duration, if yes, then transmit the spare switching instruction to the light-emitting driving unit 2. When it is detected that the accumulative luminescence duration is greater than or equal to the second threshold duration, it indicates that the luminescence unit has been used for a relatively long time, and the luminescence material with the blue sub-pixels has been worn out, and there is a need to use the spare blue sub-pixels to replace them to emit blue light. If it is detected that the accumulative luminescence duration is less than the second threshold duration, it is possible to continue to control them to perform luminescence with the solution that only the original blue sub-pixels are present in the prior art, and execute original control processes.

The second timing unit 41 is configured to accumulate the luminescence duration of the display unit 1 to obtain the accumulative luminescence duration. The second timing unit 41 may be a timer circuit without reset, which performs timing with power on and luminescence of the display unit 1, and suspends timing after the display unit 1 is powered off, and the display unit 1 continues the previous timing until the display unit 1 is powered on and performs luminescence next time, thereby accumulating the luminescence duration of the display unit 1.

In this embodiment, the second timing unit 41 and the second control unit 42 implement a switching control of the spare blue sub-pixels, which improves the control reliability.

Figure 8:
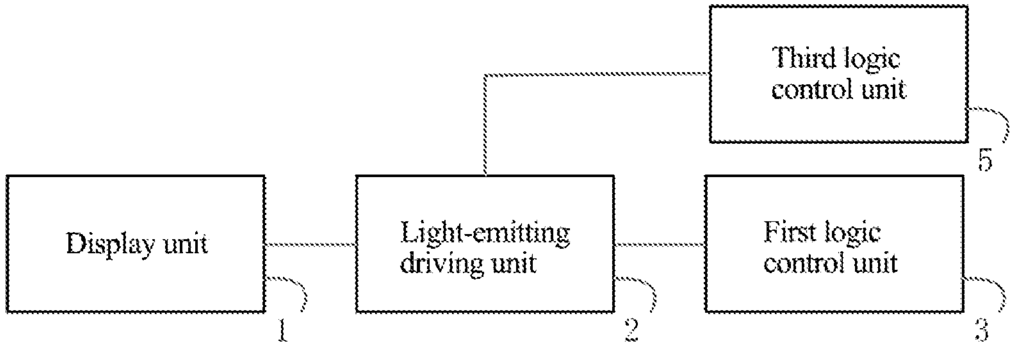
FIG. 8 is a schematic structural diagram of yet another display device according to an embodiment of the present application, where the display device further includes a third logic control unit.

On the basis of the above-mentioned embodiments shown in any one of FIG. 3, FIG. 5, FIG. 6, and FIG. 7, the driving current of the blue sub-pixels may also be controlled to maintain the brightness of the blue sub-pixels within a preset range, which improves the reliability of the blue sub-pixels. Refer to FIG. 8, which is a schematic structural diagram of yet another display device according to an embodiment of the present application. For example, a third logic control unit 5 may be added on the basis of the structure shown in FIG. 3, to obtain the display device shown in FIG. 8. However, this embodiment may also be combined with the embodiment shown in FIG. 6 or FIG. 7, that is, the third logic control unit 5 is added to the implementation shown in FIG. 6 or FIG. 7, which will not be repeated here.

In the embodiment shown in FIG. 8, the display unit 1 includes blue sub-pixels. For example, the display unit 1 includes a plurality of pixel units, and each pixel unit includes blue sub-pixels, red sub-pixels, and green sub-pixels. The blue sub-pixels here may include only the original blue sub-pixels, and may also include the original blue sub-pixels and the spare blue sub-pixels, and which is not limited here.

In the embodiment shown in FIG. 8, the third logic control unit 5 is configured to acquire an accumulative luminescence duration of the display unit 1, and transmit a luminescence control instruction to the light-emitting driving unit 2 according to pre-stored luminescence decay compensation data and the accumulative luminescence duration, where the luminescence decay compensation data includes a plurality of accumulative luminescence durations and driving current values corresponding to each accumulative luminescence duration.

The accumulative luminescence duration may be acquired by the third logic control unit 5 with its own timing function, and may also be acquired by the third logic control unit 5 from the second the timing unit 41 in the embodiment combined with the embodiment shown in FIG. 6 or FIG. 7.

The third logic control unit 5 may acquire the luminescence decay compensation data from its own storage unit or an external storage unit. The luminescence decay compensation data may be a mapping table that specifies a corresponding preset value driving current value of each accumulative luminescence duration or each period of the accumulative luminescence duration, where the luminescence unit may use this driving current value to enable the blue sub-pixels to reach an expected brightness range of blue light, which avoids the screen being yellowish. Alternatively, the luminescence decay compensation data may be duration-luminescence efficiency decay relationship curve data, and the third logic control unit 5 calculates a driving current that currently needs to realize a brightness compensation of blue light according to the relationship curve data. The form of the luminescence decay compensation data may not be limited here.

The light-emitting driving unit 2 is further configured to adjust the driving current of the blue sub-pixels according to the luminescence control instruction, so that the luminescence brightness of the blue sub-pixels reaches a preset blue light brightness range.

As the accumulative luminescence duration of the luminescence unit increases, the luminescence material with the blue sub-pixels is gradually aging, the brightness of the blue sub-pixels after the material is aging can be improved by gradually strengthening the driving current of the blue sub-pixels, thereby a brightness range of blue light in the luminescence unit is maintained, the reliability of blue light in the luminescence unit 1 is improved, the possibility that a display color becomes yellow due to the aging of the blue sub-pixels is reduced, and the user experience is improved.

Figure 9:
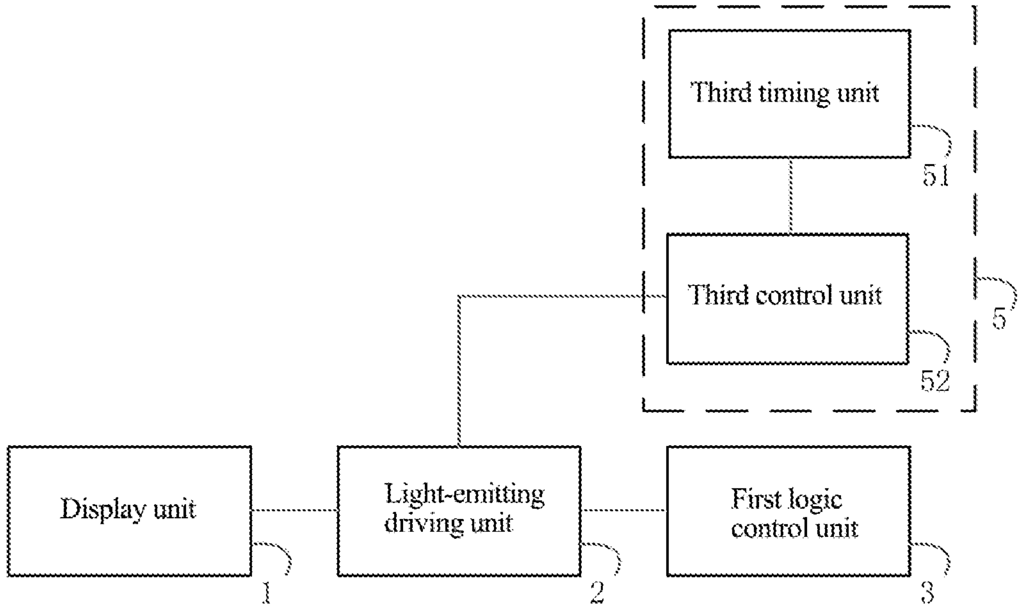
FIG. 9 is a schematic structural diagram of yet another display device according to an embodiment of the present application, a third logic control unit includes a third timing unit and a third control unit.

On the basis of the embodiment shown in FIG. 8, refer to FIG. 9, it is a schematic structural diagram of yet another display device according to an embodiment of the present application. The third logic control unit 5 shown in FIG. 9 includes a third timing unit 51 and a third control unit 52. The third timing unit 51 shown in FIG. 9 may specifically refer to the second timing unit 41 in the embodiment shown in FIG. 7, which is also configured to accumulate the luminescence duration of the display unit 1 to obtain the accumulative luminescence duration, the structure and the effect are the same, which will not be repeated here.

In the embodiment shown in FIG. 9, the third control unit 52 is configured to acquire the accumulative luminescence duration of the display unit 1 from the third timing unit 51, and transmit the light luminescence control instruction to the light light-emitting driving unit 2 according to the pre-stored luminescence decay compensation data and the accumulative luminescence duration, where the light luminescence decay compensation data includes a plurality of accumulative luminescence durations and driving current values corresponding to each accumulative luminescence duration.

In this embodiment, the third timing unit 51 and the third control unit 52 are configured to control the driving current of the blue sub-pixels, which improves the control reliability.

The embodiments of the present application also provide a display equipment, including any display device provided in the above various embodiments. The display equipment includes, but is not limited to, equipment having display functions such as mobile phones, personal digital assistants (PDA), tablet computers, e-books, televisions, access control, smart fixed phones, consoles, the present application does not limit the form of the display device.

In the present application, unless otherwise specification and limitation, the terms "connection" and the like shall be interpreted in a broad sense, for example, it may be electrical connection or may communicate with each other; it may be directly connected or indirectly connected through an intermediary, may be an inner connection between two elements or an interaction relationship between two elements. For those of ordinary skill in the art, the specific meanings of the above-mentioned terms in the present application may be understood according to specific circumstances.

Finally, it should be noted that the above embodiments are merely intended for describing, rather than limiting, the technical solutions of the present application; although the present application has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present application.

What is claimed is:

1. A display device, comprising:

a display unit, wherein the display unit comprises blue sub-pixels;

a first logic control unit, which is configured to receive image display data for instructing the display unit to display a static image in a local area, wherein a transmission frequency of replacement display data is a preset maintenance frequency, and the replacement display data is used to enable the display unit to display a replacement color image in the local area;

a light-emitting driving unit configured to alternately receive the replacement display data and the image display data from the first logic control unit after the local area maintains displaying the static image beyond a first threshold duration, which is respectively connected to the first logic control unit and the display unit, and is configured to respond to the data received from the first logic control unit, and control the display unit to display the static state image or the replacement color image;

a first timing unit configured to respond to the image display data received by the first logic control unit and measure a duration that the local area maintains displaying the static image to obtain a first display duration; and a second timing unit configured to accumulate a luminescence duration of the display unit to obtain an accumulative luminescence duration and implement a switching control of the blue sub-pixels, wherein the blue sub-pixels comprise both original blue sub-pixels and spare blue sub-pixels, and the display device further comprises a second logic control unit, configured to transmit a spare switching instruction to the light-emitting driving unit after it is determined that an accumulative luminescence duration of the display unit exceeds a second threshold duration; and the light-emitting driving unit is further configured to:

transmit drive information to the original blue sub-pixels before receiving the spare switching instruction, respond to the spare switching instruction after receiving the spare switching instruction, transmit the drive information to the spare blue sub-pixels, and perform luminescence by replacing the original blue sub-pixels with the spare blue sub-pixels; and the second logic control unit comprises:

a second control unit configured to acquire the accumulative luminescence duration of the display unit from the second timing unit, and judge whether the accumulative luminescence duration is greater than or equal to the second threshold duration, when the accumulative luminescence duration is greater than or equal to the second threshold duration, transmit the spare switching instruction to the light-emitting driving unit.

2. The device according to claim 1, wherein the first logic control unit is further configured to acquire the preset replacement color image before alternately transmitting the preset replacement display data and the image display data to the light-emitting driving unit, or acquire the replacement color image according to graphic characteristics and color characteristics of the static image; and wherein, the replacement color image and the static image have the same graphic characteristics, and the replacement color image and the static image have different color characteristics.

3. The device according to claim 1, wherein the first logic control unit is further configured to acquire the maintenance frequency according to a refresh frequency of the display unit before alternately transmitting the preset replacement display data and the image display data to the light-emitting driving unit, wherein the maintenance frequency is 5%-30% of the refresh frequency.

4. The device according to claim 1, wherein the first logic control unit comprises:

the first control unit configured to:

receive the image display data for instructing the display unit to display the static image in the local area, and acquire a first display duration that the local area maintains displaying the static image from the first timing unit, and judge whether the first display duration exceeds the first threshold duration, when the first display duration exceeds the first threshold duration, alternately transmit the preset replacement display data and the image display data to the light-emitting driving unit, when the first display duration does not exceed the first threshold duration, transmit the image display data to the light-emitting driving unit, wherein the transmission frequency of the replacement display data is the preset maintenance frequency, and the replacement display data is used to enable the display unit to display the replacement color image in the local area.

5. The device according to claim 4, wherein the first timing unit and the first control unit are hardware structures: a timing integrated circuit and a control integrated circuit, and the timing integrated circuit and the control integrated circuit are arranged in a chip on film.

6. The device according to claim 1, wherein the light-emitting driving unit is configured to:

transmit drive information for displaying the static image in the local area to the display unit when receiving the image display data; and transmit drive information for displaying the replacement color image in the local area to the display unit when receiving the replacement display data.

7. The device according to claim 1, wherein the light-emitting driving unit is controlled by compensating brightness with a driving current.

8. The device according to claim 1, wherein the second timing unit and the second control unit are two integrated circuits added in a chip on film, or integrated in a timing integrated circuit and a control integrated circuit.

9. The device according to claim 8, wherein the second timing unit is a timer circuit without reset.

10. The device according to claim 1, further comprising:

a third logic control unit, configured to acquire an accumulative luminescence duration of the display unit, and transmit a luminescence control instruction to the light-emitting driving unit according to pre-stored luminescence decay compensation data and the accumulative luminescence duration, wherein the luminescence decay compensation data comprises a plurality of accumulative luminescence durations, and driving current values corresponding to each accumulative luminescence duration; and the light-emitting driving unit is further configured to adjust a driving current of blue sub-pixels according to the luminescence control instruction, so that a luminescence brightness of the blue sub-pixels reaches a preset blue light brightness range.

11. The device according to claim 10, wherein the accumulative luminescence duration is acquired by the third logic control unit with its own timing function, or is acquired by the third logic control unit from a second timing unit, wherein the second timing unit and a second control unit are two integrated circuits added in a chip on film, or integrated in a timing integrated circuit and a control integrated circuit.

12. The device according to claim 10, wherein the luminescence decay compensation data is acquired from an own storage unit or an external storage unit of the third logic control unit.

13. The device according to claim 10, wherein the luminescence decay compensation data is a mapping table that specifies a corresponding preset value driving current value of each accumulative luminescence duration or each period of the accumulative luminescence duration; or is duration-luminescence efficiency decay relationship curve data, wherein the third logic control unit calculates a driving current that currently needs to realize a brightness compensation of blue light according to the relationship curve data.

14. The device according to claim 10, wherein the third logic control unit comprises a third timing unit and a third control unit; the third control unit is configured to acquire the accumulative luminescence duration of the display unit from the third timing unit, and transmit the luminescence control instruction to the light-emitting driving unit according to the pre-stored luminescence decay compensation data and the accumulative luminescence duration, wherein the luminescence decay compensation data comprises a plurality of accumulative luminescence durations, and drive current values corresponding to each accumulative luminescence duration; and the third timing unit is configured to accumulate a luminescence duration of the display unit to obtain the accumulative luminescence duration.

15. The device according to claim 1, wherein the display unit further comprises red sub-pixels and green sub-pixels.

16. A display equipment, comprising the display device according to claim 1.

* * * * *